(12) United States Patent
Evans

(10) Patent No.: US 7,142,549 B2
(45) Date of Patent: Nov. 28, 2006

(54) DIGITAL HIERARCHY BASED COMMUNICATION SYSTEMS

(75) Inventor: Gregory M Evans, Raleigh, NC (US)

(73) Assignee: ECI Telecom Ltd., Petach Tikva (IL)

( * ) Notice: Subject to any disclaimer, the term of this patent is extended or adjusted under 35 U.S.C. 154(b) by 799 days.

(21) Appl. No.: 09/862,446

(22) Filed: May 23, 2001

(65) Prior Publication Data

US 2004/0213253 A1    Oct. 28, 2004

(30) Foreign Application Priority Data

May 23, 2000  (IL) .................................... 136318

(51) Int. Cl.
*H04L 12/56* (2006.01)
*H04J 3/16* (2006.01)

(52) U.S. Cl. .............................. 370/395.51; 370/395.6; 370/466; 370/535

(58) Field of Classification Search ............. 370/395.5, 370/395.6, 401, 535, 539, 464–467, 541
See application file for complete search history.

(56) References Cited

U.S. PATENT DOCUMENTS

| | | | | |
|---|---|---|---|---|
| 5,568,486 | A * | 10/1996 | Huscroft et al. | 370/395.2 |
| 5,995,504 | A * | 11/1999 | Swerdlow | 370/360 |
| 6,005,865 | A * | 12/1999 | Lewis et al. | 370/398 |
| 6,597,689 | B1 * | 7/2003 | Chiu et al. | 370/354 |
| 6,631,133 | B1 * | 10/2003 | Christie et al. | 370/395.2 |
| 6,751,224 | B1 * | 6/2004 | Parruck et al. | 370/395.6 |
| 2001/0012288 | A1 * | 8/2001 | Yu | 370/352 |

FOREIGN PATENT DOCUMENTS

CA      2345074      3/2000

(Continued)

OTHER PUBLICATIONS

Park et al., Implementation of the ATM Adaption Layer for VTOA services, ICICS, Singapore, Sep. 9-12, 1997, IEEE, 0-7803-3676-3/97, pp. 786-789.*
Sunaga et al., System Architecture for a Large-Scale Public VTOA Handling Node, NTT Network Service System Laboratories, IEEE, 0-7803-4788-9/98, 1998, pp. 275-280.*

(Continued)

*Primary Examiner*—Chi Pham
*Assistant Examiner*—Tri H. Phan
(74) *Attorney, Agent, or Firm*—Browdy and Neimark, PLLC

(57) ABSTRACT

An interface device for providing a gateway function between lines of a public switched telephone network (PSTN) that carry digital hierarchy signals and an asynchronous transfer mode (ATM) backbone network that carries signals in ATM format, the interface device comprising: a telephony transceiver operative to receive upstream digital hierarchy signals in a plurality of digital hierarchies from the PSTN; a hierarchy converter associated with the telephony transceiver and operative to convert at least some of said upstream digital hierarchy signals in a plurality of digital hierarchies to upstream signals in a single digital hierarchy distributed over a plurality of logical channels; an inverse multiplexing unit operatively associated with the hierarchy converter and operative to inverse-multiplex the upstream signals in the single digital hierarchy distributed over a plurality of logical channels; an ATM framer operatively associated with the inverse multiplexing unit and operative to map at least some of the upstream inverse-multiplexed digital hierarchy signals into ATM cells; and an ATM transceiver operatively associated with the ATM framer and operative to transmit said upstream signals in ATM format to the ATM backbone network.

40 Claims, 12 Drawing Sheets

FOREIGN PATENT DOCUMENTS

| | | |
|---|---|---|
| CA | 2349453 | 5/2000 |
| DE | 198 43 625 A1 | 3/2000 |
| DE | 198 50 641 A1 | 5/2000 |
| EP | 000917394 A2 * | 5/1999 |
| WO | WO 98/24228 A2 | 6/1998 |
| WO | WO 00/17945 | 3/2000 |
| WO | WO 00/27163 | 5/2000 |

OTHER PUBLICATIONS

Grilo et al., VTOA/VoIP/ISDN Telephone Gateway, INESC, Portugal, IEEE, 0-7803-5428-1/99, 1999, pp. 230-235.*

Kevin Woods, "Implementing HDSL2 and IMA-Based VPNs," http://www.pairgain.com/presentations/pres.home.asp. Apr. 2000, Pairgain Technologies, Inc.

* cited by examiner

US 7,142,549 B2

DIGITAL HIERARCHY BASED COMMUNICATION SYSTEMS

FIELD OF THE INVENTION

The present invention generally relates to communication systems, and more particularly to digital hierarchy based communication systems.

BACKGROUND OF THE INVENTION

The deployment of digital-subscriber-line (DSL) services typically involves deployment of DSL based units in the digital line carrier (DLC) environment. Such deployment creates a need to cost effectively back haul T1 circuits from DLC street cabinets to asynchronous transfer mode (ATM) networks.

Typically the back hauling of T1 circuits and termination into an ATM network is achieved by one of the following: (1) terminating directly on an ATM edge switch, (2) terminating on a DSL Access Multiplexer (DSLAM), and (3) terminating on a multi-service access platform.

Implementation of termination directly on the ATM switch typically requires termination of groups of inverse-multiplexers ATM (IMA) directly on the ATM switch. In such a case, the bandwidth available per slot of the ATM switch is typically much higher than the available space to locate IMA functionality and thus common equipment features of the ATM switch are not used cost effectively.

When implementing termination on a DSLAM, concentration of traffic when implemented cost-effectively produces a performance penalty. The performance penalty occurs by under allocating the access bandwidth of the DSLAM for DLC based terminations. Such under allocation affects all service classes from constant bit rate (CBR) services to unspecified bit rate (UBR) services by asymmetrically concentrating ports of DSL standard communication (xDSL) directly on the DSLAM with xDSL ports that already have been concentrated at the DLC site.

CBR service is impacted by the way a call admission & control (CAC) unit at the DLC handles bandwidth reservation at the DLC versus bandwidth reservation at the DSLAM. In UBR service, ATM cells originating from a DLC based access port have a higher probability of discard or delay than cells originating from a DSLAM access port. Such discard or delay of cells typically occurs because UBR traffic has to pass through both a DLC based scheduler and a DSLAM scheduler, while the DSLAM has only one scheduler to clear.

When implementing termination on a multi-service access platform, typically with other Layer 3 and 4 applications, the available slot bandwidth is limited to a low number of IMA groups so a limited number of DLC sites can be supported thus resulting in a relatively high cost per T1 circuit.

A suggested implementation of HDSL2 and IMA based virtual private networks (VPNs) is described in a presentation of Kevin Woods, Pairgain Technologies, Inc. dated April 2000 at the Internet site http://www.pairgain.com/presentations/pres.home.asp.

The disclosures of all references mentioned above and throughout the present specification are hereby incorporated herein by reference.

SUMMARY OF THE INVENTION

The present invention seeks to provide novel apparatus and improved method for interfacing different types of digital hierarchy communication systems.

In the present invention, an interface device provides a gateway function between lines of a public switched telephone network (PSTN) that carry digital hierarchy signals in a plurality of digital hierarchies and an asynchronous transfer mode (ATM) backbone network that carries signals in ATM format. The interface device may be employed in various configurations of communication systems.

There is thus provided, in accordance with a preferred embodiment of the present invention, an interface device operating in an upstream direction for providing a gateway function between lines of a public switched telephone network (PSTN) that carry digital hierarchy signals in a plurality of digital hierarchies and an asynchronous transfer mode (ATM) backbone network that carries signals in ATM format, the interface device including a telephony transceiver operative to receive upstream digital hierarchy signals in a plurality of digital hierarchies from the PSTN, a hierarchy converter operatively associated with the telephony transceiver and operative to convert at least some of the upstream digital hierarchy signals in a plurality of digital hierarchies to upstream signals in a single digital hierarchy distributed over a plurality of logical channels, an inverse multiplexing unit operatively associated with the hierarchy converter and operative to inverse-multiplex the upstream signals in the single digital hierarchy distributed over a plurality of logical channels thereby to form upstream inverse-multiplexed digital hierarchy signals, an ATM framer (e.g. UTOPIA) operatively associated with the inverse multiplexing unit and operative to map at least some of the upstream inverse-multiplexed digital hierarchy signals into ATM cells thereby to form upstream signals in ATM format, and an ATM transceiver operatively associated with the ATM framer and operative to transmit the upstream signals in ATM format to the ATM backbone network.

Preferably, the digital hierarchy signals in a plurality of digital hierarchies include at least one of the following: T1/E1 signals, T3/E3 signals, STS-N/STM-N signals, where N is an integer, and OC-M signals, where M is an integer.

Preferably, the telephony transceiver includes at least one of the following: an optical carrier (OC) of level M (OC-M) transceiver, where M is an integer, a DS1 transceiver, and a DS3 transceiver. The hierarchy converter preferably includes at least one of the following: a demultiplexer, and a multiplexer. The inverse multiplexing unit preferably includes a plurality of inverse-multiplexers ATM (IMAS) each capable of multiplexing signals carried over a plurality of logical channels. The ATM transceiver preferably includes at least one of the following: an OC-M transceiver, where M is an integer, and an STS-N/STM-N transceiver, where N is an integer.

The interface device operating in the upstream direction also preferably includes an ATM bus operatively associated with the inverse multiplexing unit and the ATM framer (preferably ATM UTOPIA framer) and operative to receive the upstream inverse-multiplexed digital hierarchy signals from the inverse multiplexing unit, and to provide the upstream inverse-multiplexed digital hierarchy signals to the ATM framer. Preferably, the ATM bus includes a multi-UTOPIA bus.

Additionally, the interface device operating in the upstream direction may also include AAL1 circuitry for providing constant bit rate (CBR) services that require a timing relation between endpoints of connections. Further additionally, the interface device may also include Frame-Relay/ATM internetworking circuitry for interfacing to a Frame-Relay.

Preferably, at least one of the hierarchy converter and the telephony transceiver is operative to provide a series of digital hierarchy signals to the ATM UTOPIA framer, and an ATM UTOPIA framer is operative to map the series of digital hierarchy signals into ATM cells thereby forming a series of signals in ATM format.

In accordance with a preferred embodiment of the present invention there is also provided an interface device operating in a downstream direction for providing a gateway function between lines of a public switched telephone network (PSTN) that carry digital hierarchy signals in a plurality of digital hierarchies and an asynchronous transfer mode (ATM) backbone network that carries signals in ATM format, the interface device including an ATM transceiver operative to receive downstream signals in ATM format from the ATM backbone network, an ATM UTOPIA framer operatively associated with the ATM transceiver and operative to map the downstream signals in ATM format into downstream digital hierarchy signals, an inverse multiplexing unit operatively associated with the ATM UTOPIA framer and operative to inverse-demultiplex at least some of the downstream digital hierarchy signals thereby providing downstream signals in a single digital hierarchy distributed over a plurality of logical channels, a hierarchy converter operatively associated with the inverse multiplexing unit and operative to convert the downstream signals in a single digital hierarchy distributed over a plurality of logical channels to downstream digital hierarchy signals in a plurality of digital hierarchies, and a telephony transceiver operatively associated with the hierarchy converter and operative to transmit the downstream digital hierarchy signals in a plurality of digital hierarchies to the PSTN.

Preferably, the digital hierarchy signals in a plurality of digital hierarchies include at least one of the following: T1/E1 signals, T3/E3 signals, STS-N/STM-N signals, where N is an integer, and OC-M signals, wherein M is an integer.

Preferably, the telephony transceiver includes at least one of the following: an optical carrier (OC) of level M (OC-M) transceiver, where M is an integer, a DS1 transceiver, and a DS3 transceiver. The hierarchy converter preferably includes at least one of the following: a demultiplexer, and a multiplexer. The inverse multiplexing unit preferably includes a plurality of inverse-demultiplexers ATM each capable of demultiplexing signals carried over a plurality of logical channels. The ATM transceiver preferably includes at least one of the following: an OC-M transceiver, where M is an integer, and an STS-N/STM-N transceiver, where N is an integer.

The interface device operating in the downstream direction also preferably includes an ATM bus operatively associated with the ATM UTOPIA framer and the inverse multiplexing unit and operative to receive the downstream digital hierarchy signals from the ATM UTOPIA framer, and to provide the downstream digital hierarchy signals to the inverse multiplexing unit. Preferably, the ATM bus includes a multi-UTOPIA bus.

Additionally, the interface device operating in the downstream direction may also include AAL1 circuitry for providing constant bit rate (CBR) services that require a timing relation between endpoints of connections. Further additionally, the interface device operating in the downstream may also include Frame-Relay/ATM internetworking circuitry for interfacing to a Frame-Relay.

In accordance with a preferred embodiment of the present invention the interface device operating in the upstream and the interface device operating in the downstream may be embodied in a single communication device.

Also in accordance with a preferred embodiment of the present invention there is provided a communication network including a PSTN, an ATM backbone network, and the interface devices operating in the upstream and downstream direction operatively associated with the PSTN and the ATM backbone network.

There is also provided, in accordance with a preferred embodiment of the present invention a communication apparatus including an ATM switch, a digital access cross-connect system (DACS), and the interface devices operating in the upstream and downstream directions operatively associated with the ATM switch and the DACS. Preferably, the communication apparatus may also include a SONET/SDH multiplexer operatively associated with the DACS and operative to provide to the DACS OC-M telephony signals, where M is an integer.

Further in accordance with a preferred embodiment of the present invention there is provided ATM switching fabric including a plurality of the interface devices operating in the upstream and downstream directions, each of the plurality of the interface devices operating in the upstream and downstream directions being operatively associated with the ATM switching fabric and the ATM backbone network.

There is also provided in accordance with a preferred embodiment of the present invention a method for providing a gateway function between lines of a network that carries signals in ATM format, the method including, in an upstream direction, the steps of receiving upstream digital hierarchy signals in a plurality of digital hierarchies from the PSTN, converting at least some of the upstream digital hierarchy signals in a plurality of digital hierarchies to upstream signals in a single digital hierarchy distributed over a plurality of logical channels, inverse-multiplexing the upstream signals in the single digital hierarchy distributed over a plurality of logical channels thereby forming upstream inverse-multiplexed digital hierarchy signals, mapping at lease some of the upstream inverse-multiplexed digital hierarchy signals into ATM cells thereby forming upstream signals in ATM format, and transmitting the upstream signals in ATM format to the ATM backbone network.

Preferably, the converting step includes the step of demultiplexing the at least some of the upstream digital hierarchy signals in a plurality of digital hierarchies thereby providing the upstream signals in a single digital hierarchy distributed over a plurality of logical channels. Additionally or alternatively, the method also includes the step of mapping at least some of the upstream signals in a single digital hierarchy distributed over a plurality of logical channels into upstream AAL1 type signals. Further additionally or alternatively, the method may also include the step of mapping at least some of the upstream signals in a single digital hierarchy distributed over a plurality of logical channels into upstream signals suitable for transmission over a Frame-Relay.

In a downstream direction, the method also includes the steps of receiving downstream signals in ATM format from the ATM backbone network, mapping the downstream signals in ATM format into downstream digital hierarchy signals, inverse-demultiplexing at least some of the downstream digital hierarchy signals thereby providing downstream signals in a single digital hierarchy distributed over a plurality of logical channels, converting the downstream signals in a single digital hierarchy distributed over a plurality of logical channels to downstream digital hierarchy signals in a plurality of digital hierarchies, and transmitting the downstream digital hierarchy signals in a plurality of digital hierarchies to the PSTN.

Preferably, the digital hierarchy signals in a plurality of digital hierarchies include at least one of the following: T1/E1 signals, T3/E3 signals, STS-N/STM-N signals, where N is an integer, and OC-M signals, where M is an integer.

The step of converting the downstream signals in a single digital hierarchy distributed over a plurality of logical channels to downstream digital hierarchy signals in a plurality of digital hierarchies may preferably include the step of demultiplexing the downstream signals in a single digital hierarchy distributed over a plurality of logical channels thereby providing the downstream digital hierarchy signals in a plurality of digital hierarchies.

In the downstream direction the method may additionally or alternatively include the step of mapping at least some of the downstream digital hierarchy signals into downstream AAL1 type signals. Further additionally or alternatively, the method may also include, for the downstream direction, the step of mapping at least some of the downstream digital hierarchy signals into downstream signals suitable for transmission over a Frame-Relay.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
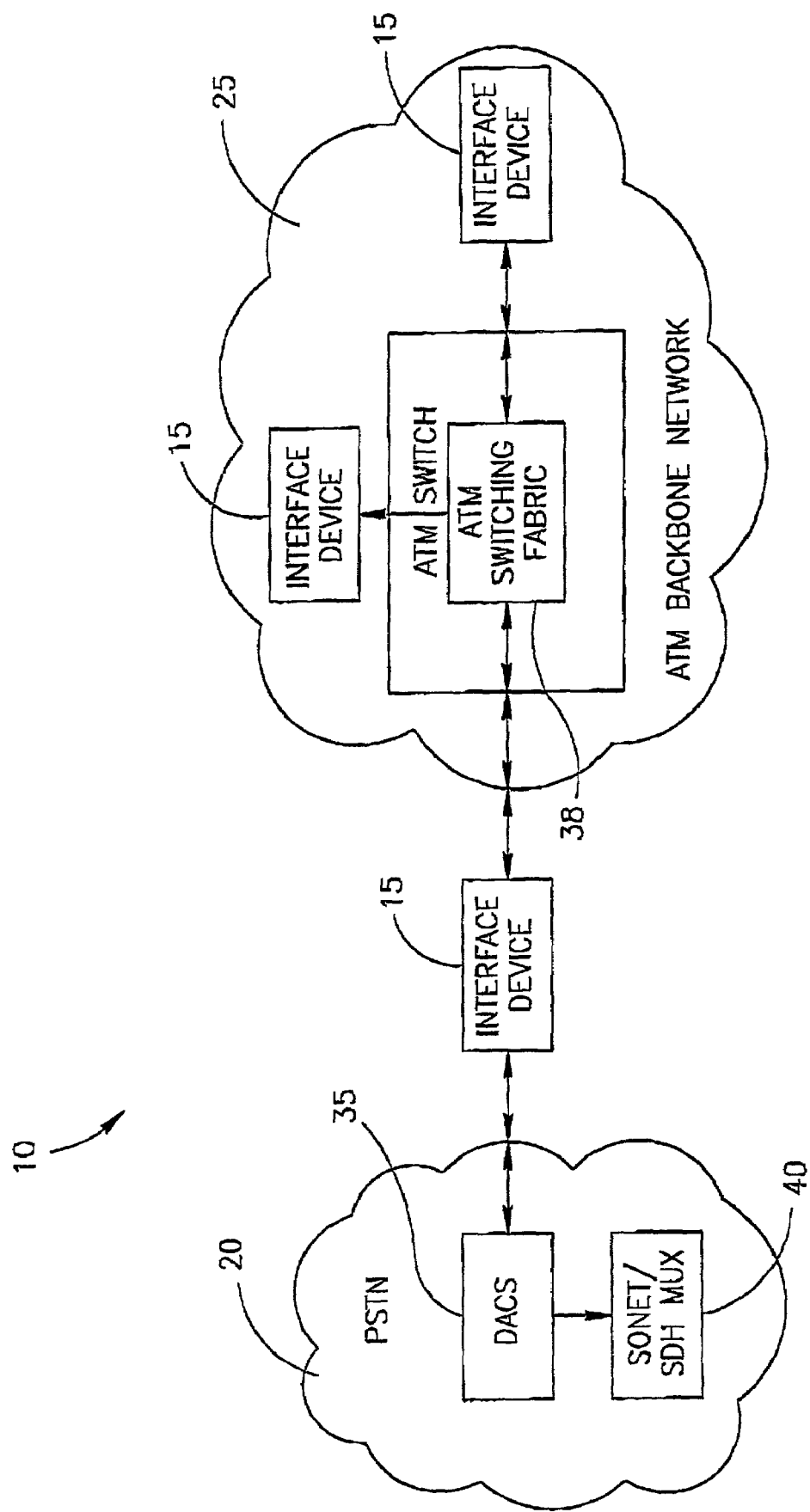
FIG. 1 is a simplified block diagram illustration of a preferred implementation of a portion of a communication system constructed and operative in accordance with a preferred embodiment of the present invention.

Reference is now made to FIG. 1 that is a simplified block diagram illustration of a portion of a communication system 10 constructed and operative in accordance with a preferred embodiment of the present invention.

In the communication system 10, an interface device 15 preferably provides a gateway function between a public switched telephone network (PSTN) 20 that transports digital hierarchy signals in a plurality of digital hierarchies and an asynchronous transfer mode (ATM) backbone network 25 that transports signals in ATM format.

Preferably, the interface device 15 is operatively associated with an ATM switch 30, which forms part of the ATM network 25, and with a digital access cross-connect system (DACS) 35. The interface device 15 is preferably operative to communicate signals in telephony format with the DACS 35 and signals in ATM format with the ATM switch 30. The ATM switch 30 may also include ATM switching fabric 38 that may be operatively associated with a plurality of the interface devices 15 and may be operative to communicate with the ATM network 25 and the PSTN 20 via the plurality of interface devices 15.

The PSTN 20 may also preferably include a multiplexer 40 that is operatively associated with the DACS 35 and is operative to provide to the DACS 35 telephony signals, such as optical carrier (OC) of level M (OC-M) telephony signals, where M is an integer. It is appreciated that the multiplexer 40 may be a SONET/SDH type multiplexer that is part of a synchronous optical network (SONET) or forms part of a synchronous digital hierarchy (SDH) based network (not shown).

Figure 2:
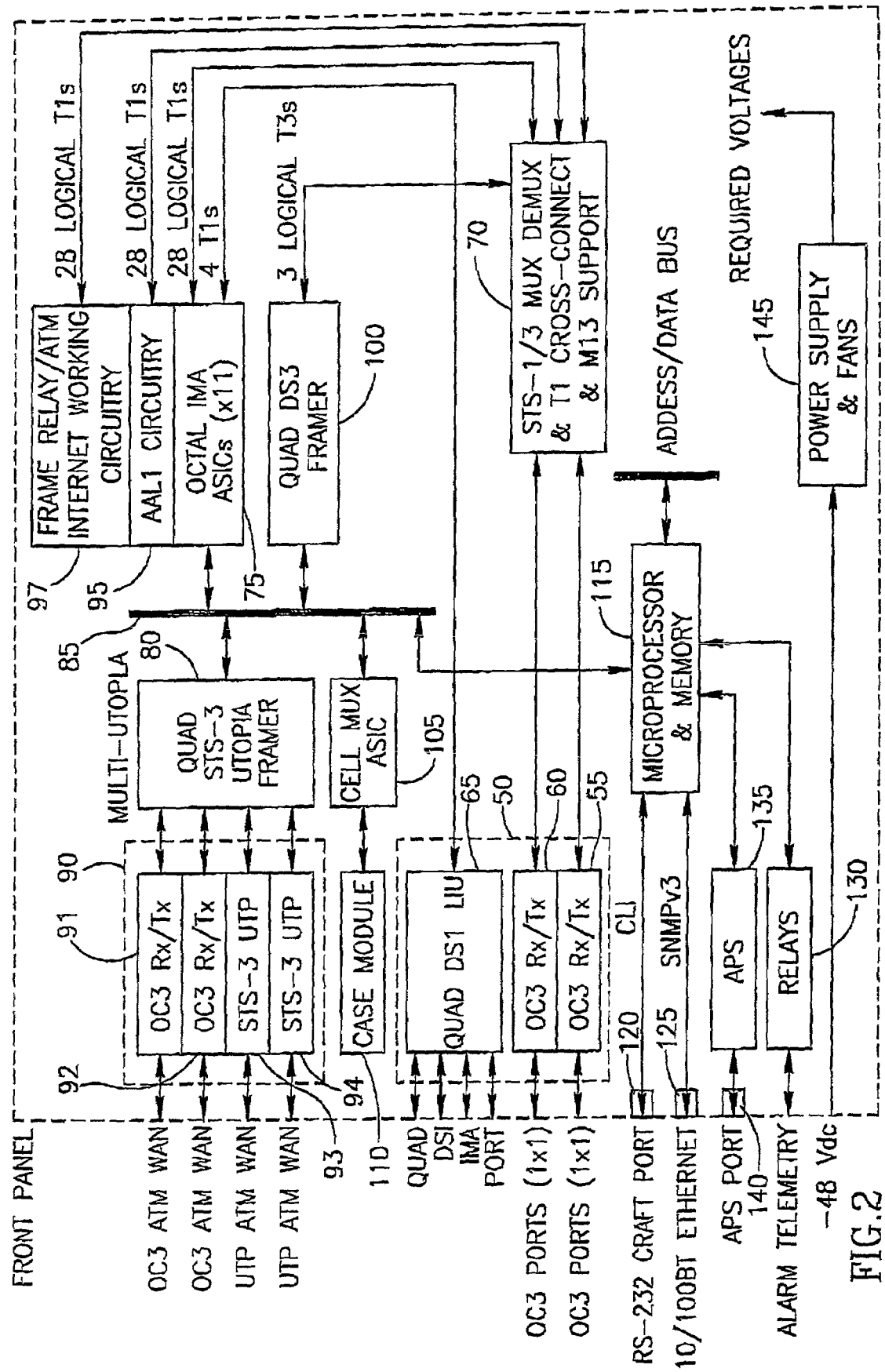
FIG. 2 is a simplified block diagram illustration of a preferred implementation of an interface device in the communication system of FIG. 1, the interface device being constructed and operative in accordance with a preferred embodiment of the present invention.

Reference is now additionally made to FIG. 2 that is a simplified block diagram illustration of a preferred implementation of the interface device 15 of FIG. 1, the interface device 15 being constructed and operative in accordance with a preferred embodiment of the present invention.

In the present specification and claims, the term "upstream" is used to refer to a direction of communication from the PSTN 20 to the ATM network 25, and the term "downstream" is used to refer to a direction of communication from the ATM network 25 to the PSTN 20. However, the present invention is not limited by selection of directions in the upstream and downstream, and rather opposite directions may be selected for the upstream and downstream directions.

Referring, for example, to the upstream direction from the PSTN 20 to the ATM network 25, the interface device 15 preferably receives upstream digital hierarchy signals in a plurality of digital hierarchies from the PSTN 20. The upstream digital hierarchy signals in a plurality of digital hierarchies preferably include at least one of the following: T1/E1 signals; T3/E3 signals; synchronous transport signal (STS) of level N (STS-N) or synchronous transport module (STM) of level N (STM-N), where N is an integer; and OC-M signals, where M is an integer. Throughout the specification and claims the term "T1/E1 signals" refers to signals communicated throughout the whole T1/E1 transport medium. Similarly, the term "T3/E3 signals" refers throughout the specification and claims to signals communicated throughout the whole T3/E3 transport medium.

The upstream digital hierarchy signals in a plurality of digital hierarchies are preferably received at a telephony transceiver 50. The term "transceiver" is used throughout the specification and claims to include a transmitter and a receiver, preferably, but not necessarily, in a combined unit. The telephony transceiver 50 may include, for example, at least one of the following: an optical carrier (OC) of level M (OC-M) transceiver, where M is an integer; a digital signal (DS) of level 1 (DS1) transceiver; and a DS3 transceiver. In the example shown in FIG. 2, the telephony transceiver 50 includes two OC-3 transceiver 55 and 60 that receive OC-3 signals via two corresponding ports, and a quad DS1 line interface unit (LIU) 65 which includes four DS1 transceivers that receive DS1 signals via four corresponding ports. However, it is appreciated that the present invention is not limited by the number and type of transceivers embodied in the telephony transceiver 50, and the telephony transceiver 50 may include additional types of transceivers and/or additional transceivers.

Preferably, the upstream digital hierarchy signals in a plurality of digital hierarchies are provided to a hierarchy converter 70, such as, but not limited to, the TMXF28155 Super Mapper that is commercially available from Lucent Technologies. The hierarchy converter 70 is operatively associated with the telephony transceiver 50 and is preferably operative to convert at least some of the upstream digital hierarchy signals in a plurality of digital hierarchies to upstream signals in a single digital hierarchy distributed over a plurality of logical channels. In the example shown in FIG. 2, the upstream signals in a single digital hierarchy distributed over a plurality of logical channels are upstream signals in the T1/E1 digital hierarchy distributed over a plurality of logical channels. In such a case, it is appreciated that no conversion is required for signals outputted from the quad DS1 LIU 65 since the quad DS1 LIU 65 outputs T1/E1 digital hierarchy signals.

The hierarchy converter 70 preferably includes at least one of the following: a demultiplexer; and a multiplexer. In the example shown in FIG. 2, the hierarchy converter 70 includes an STS-1 or STS-3 multiplexer/demultiplexer that converts the upstream OC-3 signals received from the telephony transceiver 50 to upstream signals in T1/E1 digital hierarchy distributed over a plurality of logical channels, and a cross connect that distributes the T1/E1 digital hierarchy signals to the suitable logical channels.

Preferably, the upstream signals in the single digital hierarchy distributed over a plurality of logical channels are provided to an inverse multiplexing unit 75 that is operatively associated with the hierarchy converter 70. The inverse multiplexing unit 75 is preferably operative to inverse-multiplex the upstream signals in the single digital hierarchy distributed over a plurality of logical channels thereby to form upstream inverse-multiplexed digital hierarchy signals. It is appreciated that the inverse multiplexing unit 75 may preferably include a plurality of inverse-multiplexers ATM (IMAs) each capable of multiplexing signals carried over a plurality of the logical channels.

Preferably, the inverse multiplexing unit 75 provides the upstream inverse-multiplexed digital hierarchy signals to an ATM UTOPIA framer 80 via an ATM bus, such as a multi-UTOPIA bus 85 operating at various UTOPIA levels preferably including UTOPIA level 2. The ATM UTOPIA framer 80 is preferably operative to map at least some of the upstream inverse-multiplexed digital hierarchy signals into ATM cells thereby to form upstream signals in ATM format, and to provide the upstream signals in ATM format to an ATM transceiver 90. The ATM transceiver 90 is preferably operative to transmit the upstream signals in ATM format to the ATM backbone network 25. The ATM transceiver 90 preferably includes at least one of the following: an OC-M transceiver, where M is an integer; and an STS-N/STM-N transceiver, where N is an integer. In the example shown in FIG. 2, the ATM transceiver 90 includes two OC-3 transceivers 91 and 92 and two STS-3 UTOPIA transceivers 93 and 94.

It is appreciated that the interface device 15 may also include ATM Adaptation Layer 1 (AAL1) circuitry 95 and Frame-Relay/ATM internetworking circuitry 97. The AAL1 circuitry 95 and the Frame-Relay/ATM internetworking circuitry 97 may preferably be in parallel to the inverse multiplexing unit 75 and may be operatively associated with the multi-UTOPIA bus 85 and the hierarchy converter 70. The AAL1 circuitry 95 may preferably be used for constant bit rate (CBR) services that require a timing relation between endpoints of connections as is well known in the art. The Frame-Relay/ATM internetworking circuitry 97 may preferably be used to interface to a Frame-Relay (not shown) as is well known in the art.

The AAL1 circuitry 95 may preferably map at least some of the upstream signals in the single digital hierarchy distributed over a plurality of logical channels received from the hierarchy converter 70 or at least some of the upstream inverse-multiplexed digital hierarchy signals received from the inverse multiplexing unit 75 into upstream AAL1 type signals. The Frame-Relay/ATM internetworking circuitry 97 may preferably map at least some of the upstream signals in the single digital hierarchy distributed over a plurality of logical channels received from the hierarchy converter 70 or at least some of the upstream inverse-multiplexed digital hierarchy signals received from the inverse multiplexing unit 75 into upstream signals suitable for transmission over a Frame-Relay.

It is further appreciated that at least one of the hierarchy converter 70 and the telephony transceiver 50 may also be operative to provide a series of digital hierarchy signals to the ATM UTOPIA framer 80 via the multi-UTOPIA bus 85 without inverse multiplexing the series of digital hierarchy signals by the inverse multiplexing unit 75. In such a case, the ATM UTOPIA framer 80 preferably maps the series of digital hierarchy signals into ATM cells thereby to form a series of signals in ATM format.

Referring now to a downstream direction from the ATM backbone network 25 to the PSTN 20, the ATM transceiver 90 preferably receives downstream signals in ATM format from the ATM backbone network 25. The ATM transceiver 90 preferably provides the downstream signals in ATM format to the ATM UTOPIA framer 80 which preferably maps the downstream signals in ATM format into downstream digital hierarchy signals.

Preferably, the ATM UTOPIA framer 80 provides the downstream digital hierarchy signals to the inverse multiplexing unit 75 which inverse-demultiplexes at least some of the downstream digital hierarchy signals thereby providing downstream signals in a single digital hierarchy distributed over a plurality of logical channels. It is appreciated that the inverse demultiplexing operation of the inverse multiplexing unit 75 is preferably performed in a plurality of inverse-demultiplexers ATM that preferably form part of the inverse multiplexing unit 75. Preferably, each of the plurality of inverse-demultiplexers ATM is capable of demultiplexing signals carried over a plurality of logical channels.

It is appreciated that the inverse multiplexing unit 75 may also preferably provide at least some of the downstream digital hierarchy signals to the AAL1 circuitry 95 and the Frame-Relay/ATM internetworking circuitry 97 without inverse demultiplexing thereof. The AAL1 circuitry 95 preferably maps the downstream digital hierarchy signals provided thereto into downstream AAL1 type signals, and the Frame-Relay/ATM internetworking circuitry 97 preferably maps the downstream digital hierarchy signals provided thereto into downstream signals suitable for transmission over a Frame-Relay (not shown).

Preferably, the inverse multiplexing unit 75 provides the downstream signals in a single digital hierarchy distributed over a plurality of logical channels to the hierarchy converter 70. The hierarchy converter 70 preferably converts the downstream signals in a single digital hierarchy distributed over a plurality of logical channels to downstream digital hierarchy signals in a plurality of digital hierarchies and provides the downstream digital hierarchy signals in a plurality of digital hierarchies to the telephony transceiver 50. The telephony transceiver 50 preferably transmits the downstream digital hierarchy signals in a plurality of digital hierarchies to the PSTN 20. The downstream digital hierarchy signals in a plurality of digital hierarchies may preferably include at least one of the following: T1/E1 signals; T3/E3 signals; STS-N/STM-N signals, where N is an integer; and OC-M signals, wherein M is an integer.

It is appreciated that the interface device 15 may also communicate upstream and downstream signals that are not inverse-multiplexed/demultiplexed in the inverse multiplexing unit 75. Such signals are preferably mapped by another framer, such as a quad DS3 framer 100. The quad DS3 framer 100 is preferably operatively associated with the hierarchy converter 70 and is operative to map, for example, upstream T3 signals provided by the hierarchy converter 70 to upstream ATM cells, and to provide the upstream ATM cells, via the multi-UTOPIA bus 85 and the ATM UTOPIA framer 80, to the ATM transceiver 90 for transmission thereby to the ATM network 25. The quad DS3 framer 100 is also operative to map downstream ATM cells received via the multi-UTOPIA bus 85 from the ATM UTOPIA framer 80 to logical T3 channels that are provided to the telephony transceiver 50 via the hierarchy converter 70.

The interface device 15 also includes a cell multiplexer 105 and a CASE (Core ATM Switching Engine) module 110. The CASE module 10 is preferably operative to perform ATM switching and quality-of-service (QOS) functions for the interface device 15. Typically, ATM traffic on the multi-UTOPIA bus 85 passes through the CASE module 110. The cell multiplexer 105 may preferably be used to split the multi-UTOPIA bus 85 into multiple buses in order to support many UTOPIA addresses and/or 8–16 bit UTOPIA devices.

The various units of the interface device 15 are preferably controlled by a microprocessor 115 via the multi-UTOPIA bus 85. The microprocessor 115 may preferably be operatively associated with a RS-232 Craft communication port 120 and/or an Ethernet port 125 for out-of-band management. It is appreciated that the microprocessor 115 may be also preferably operatively associated with various relays 130 for communicating alarm telemetry information and with an Automatic Protection Switching (APS) 135 for communicating control signals via an APS port 140.

The interface device 15 may also include a power supply unit 145 that preferably provides suitable electrical power to all the units of the interface device 15. The power supply unit 145 may preferably be powered by direct-current (DC) electric power at 48V drawn from the PSTN 20.

It is appreciated that the interface device 15 may alternatively be implemented as two separate interface devices operating in opposite directions of communication. In such a case, one of the separate interface devices may be used only in the upstream direction for communicating upstream signals, and the other interface device may be used only in the downstream direction for communicating downstream signals. It is appreciated that the two separate interface devices may have similar structures although they operate in opposite directions of communication.

The operation of the apparatus of FIGS. 1 and 2 is now briefly described. The interface device 15 preferably serves as a gateway function between the PSTN 20 and the ATM network 25. Preferably, when the interface device 15 receives upstream digital hierarchy signals in a plurality of digital hierarchies from the PSTN 20, at least some of the upstream digital hierarchy signals in a plurality of digital hierarchies are converted in the hierarchy converter 70 to upstream signals in a single digital hierarchy distributed over a plurality of logical channels. Conversion of the upstream digital hierarchy signals in the hierarchy converter 70 may be performed, for example, by using a demultiplexing process.

The upstream signals in the single digital hierarchy distributed over a plurality of logical channels are preferably inverse-multiplexed thereby forming upstream inverse-multiplexed digital hierarchy signals. Then, at least some of the upstream inverse-multiplexed digital hierarchy signals are mapped in the ATM UTOPIA framer 80 into ATM cells thereby forming upstream signals in ATM format. It is appreciated that some of the upstream inverse-multiplexed digital hierarchy signals may alternatively be mapped in the telephony mapper 95 into upstream telephony digital hierarchy signals suitable for transmission over the PSTN 20. Then, the upstream telephony digital hierarchy signals suitable for transmission over the PSTN 20 are transmitted to the PSTN 20, and the upstream signals in ATM format are transmitted to the ATM network 25.

In the opposite direction, that is in a downstream direction from the ATM network 25 to the PSTN 20, the interface device 15 receives downstream signals in ATM format from the ATM network 25. The downstream signals in ATM format are preferably mapped in the ATM UTOPIA framer 80 into downstream digital hierarchy signals that are preferably inverse-demultiplexed to provide downstream signals in a single digital hierarchy distributed over a plurality of logical channels.

Preferably, some the downstream signals in a single digital hierarchy distributed over a plurality of logical channels are converted, such as by demultiplexing, to downstream digital hierarchy signals in a plurality of digital hierarchies. Additionally, some of the downstream signals in a single digital hierarchy distributed over a plurality of logical channels may be mapped into downstream telephony digital hierarchy signals suitable for transmission over the PSTN 20. Then, the downstream digital hierarchy signals in a plurality of digital hierarchies and the downstream telephony digital hierarchy signals suitable for transmission over the PSTN 20 are transmitted to the PSTN 20.

The interface device 15 may be employed in various configurations in communication systems. For example, a plurality of interface devices 15 may be operatively associated with the ATM switching fabric 38 within the ATM switch 30. In such a case, the interface devices 15 may be operatively associated with communication ports (not shown) of the ATM switching fabric and any communication with the ATM switching fabric 38 is preferably performed via the interface devices 15.

Figure 3:
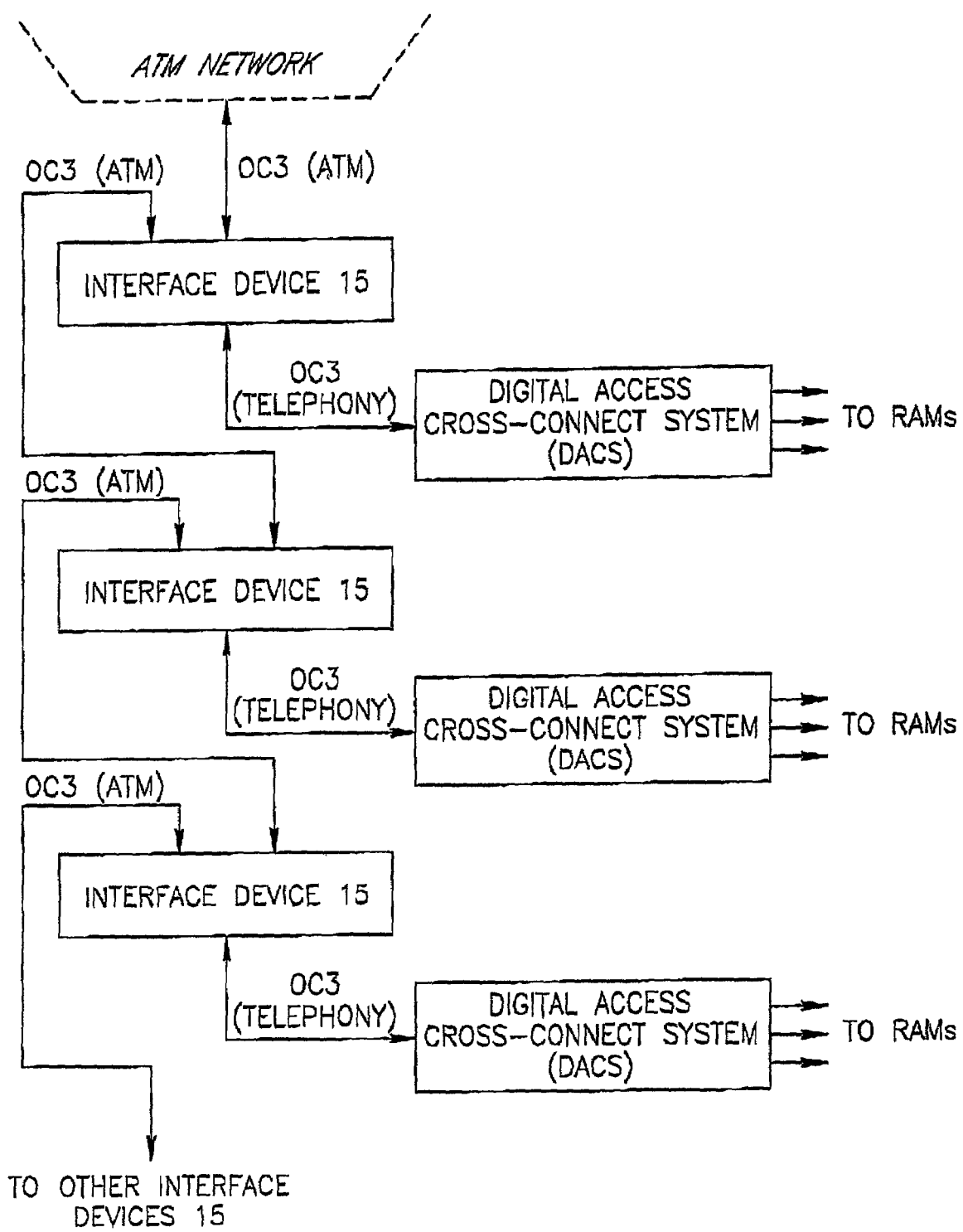
FIG. 3 is a simplified block diagram illustration of a network configuration including the interface device of FIG. 2.
Figure 4A:
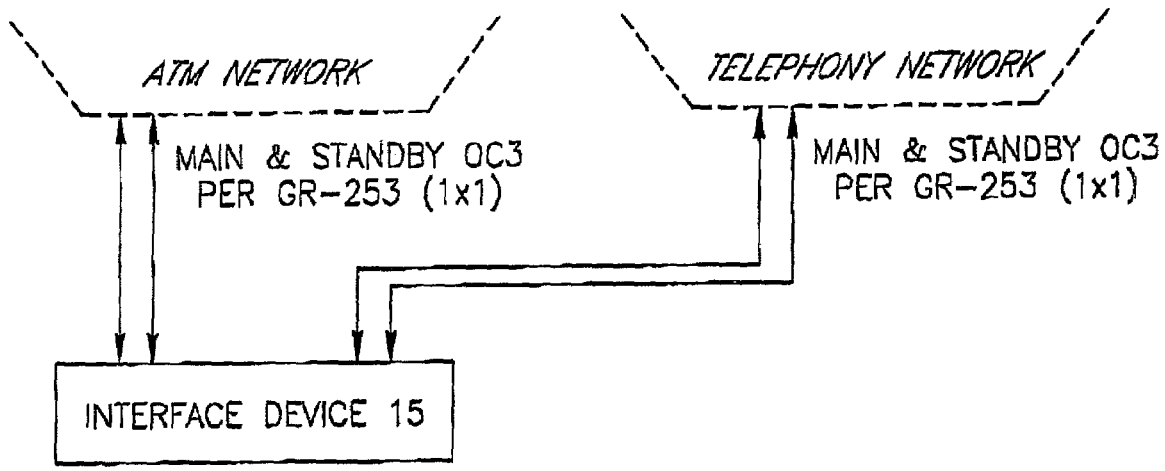
FIG. 4A is a simplified block diagram illustration of a non-redundant application with GR-253 1X1 transport protection of the interface device of FIG. 2.
Figure 4B:
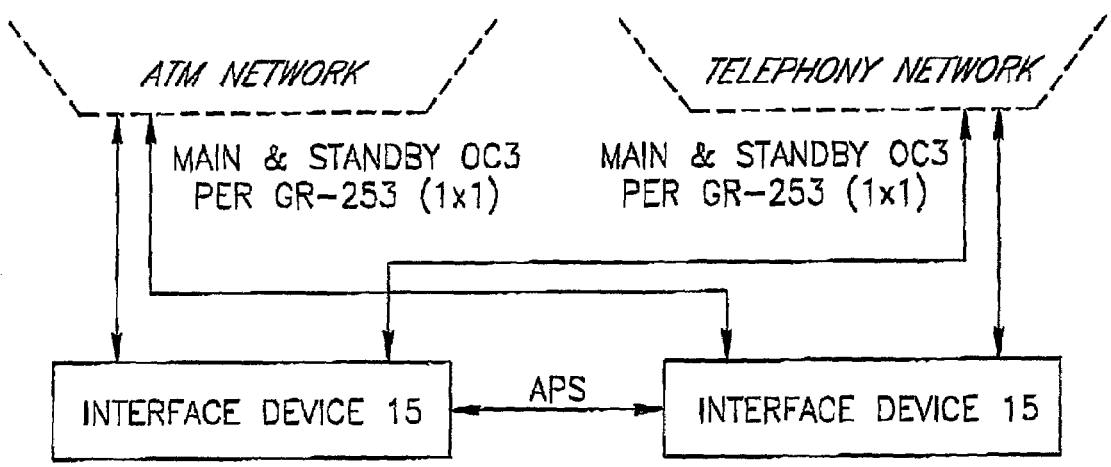
FIG. 4B is a simplified block diagram illustration of a redundant application with GR-253 1X1 transport protection of the interface device of FIG. 2.
Figure 5:
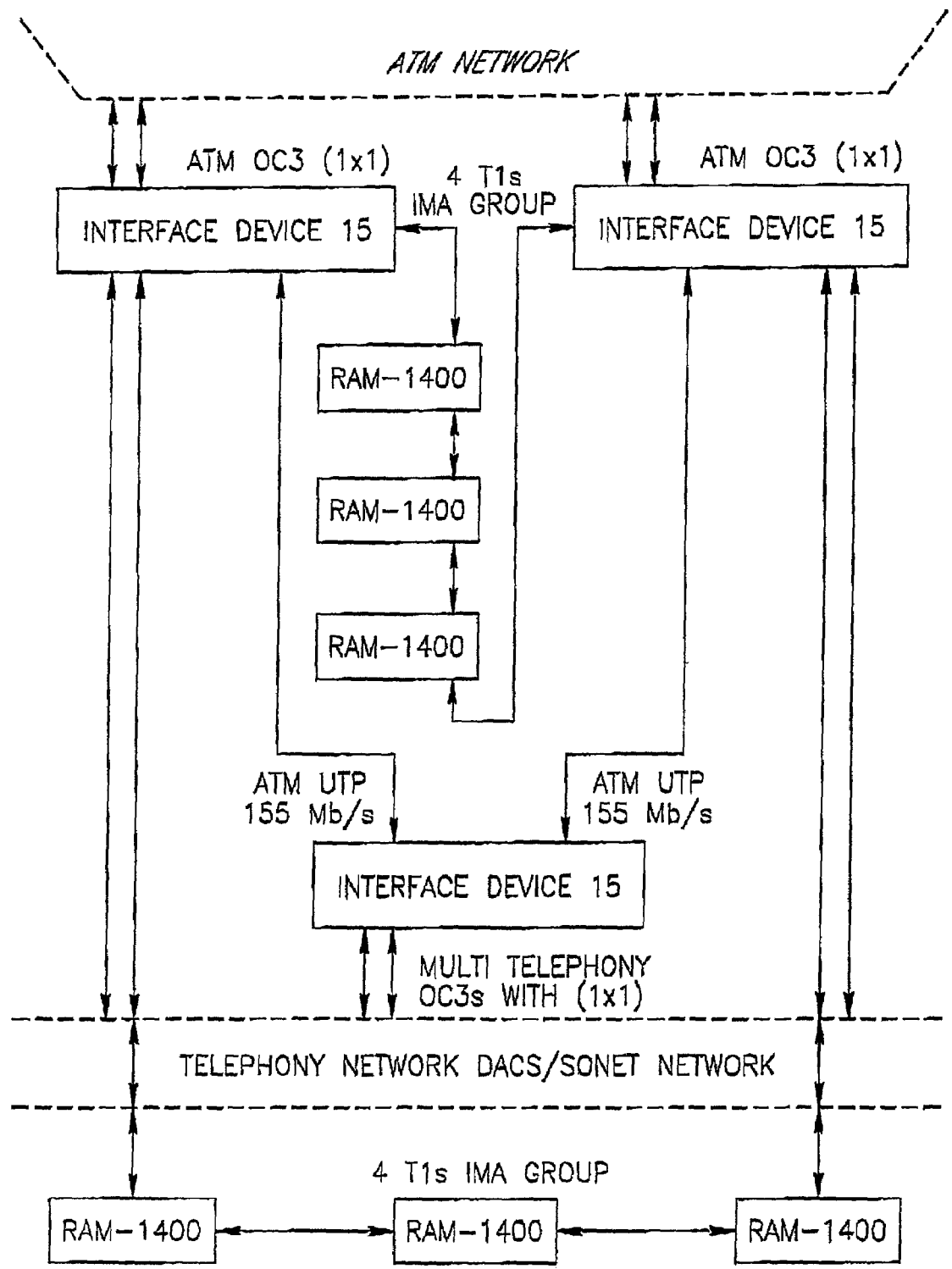
FIG. 5 is a simplified block diagram illustrating network survivability with the interface device of FIG. 2.

A configuration in which the interface device 15 is used in a cascaded form is shown in FIG. 3. In FIG. 4A a simplified block diagram illustration of a non-redundant application with GR-253 1X1 transport protection of the interface device 15 is shown, whereas a simplified block diagram illustration of a redundant application with GR-253 1X1 transport protection of the interface device 15 is shown in FIG. 4B. FIG. 5 shows network survivability with the interface device 15. RAM-1400™ that is shown in the Example of FIG. 5 and hereinafter, is a device that is commercially available from ECI Telecom Ltd.

Figure 6:
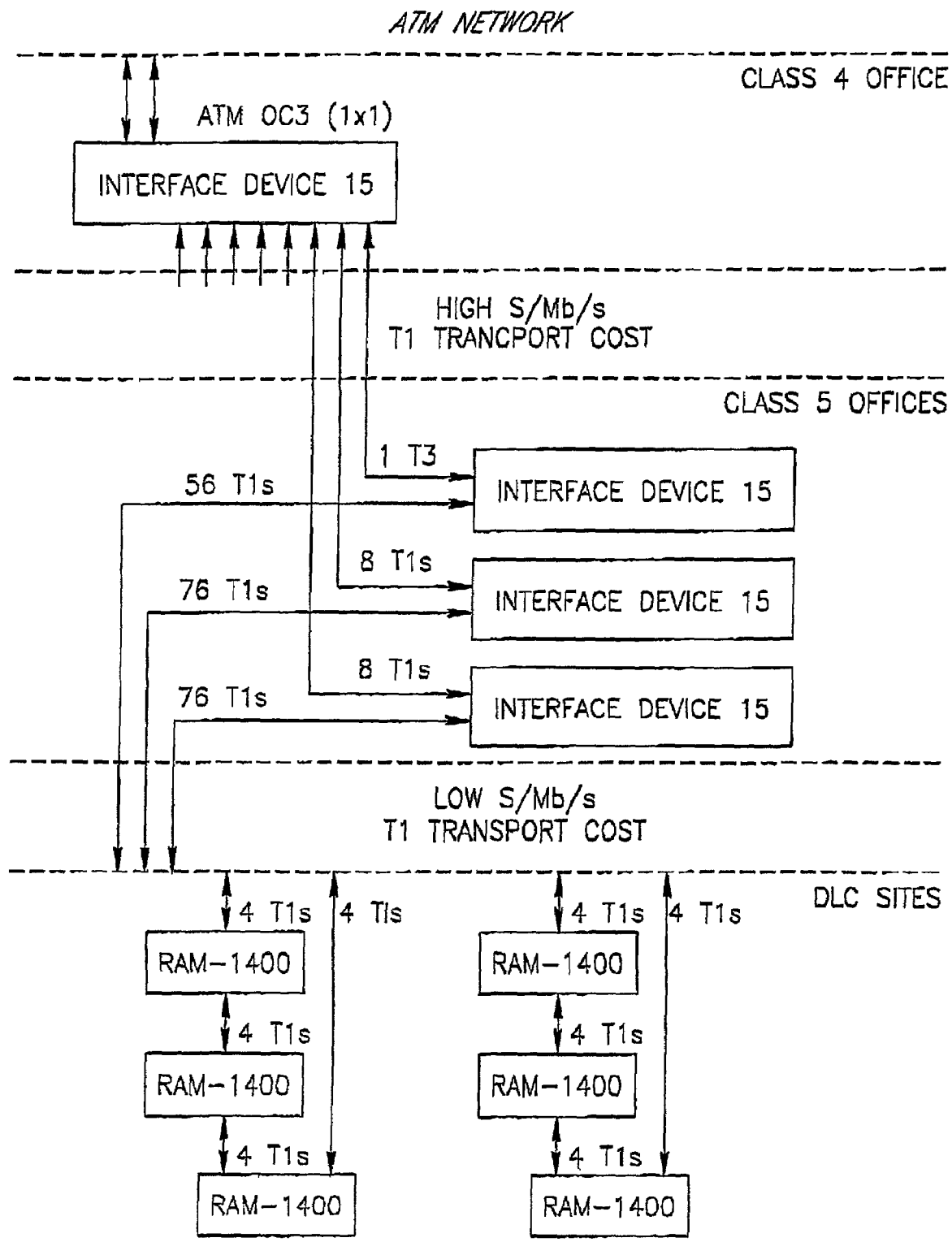
FIG. 6 is a simplified block diagram illustrating network traffic shaping with the interface device of FIG. 2.
Figure 7:
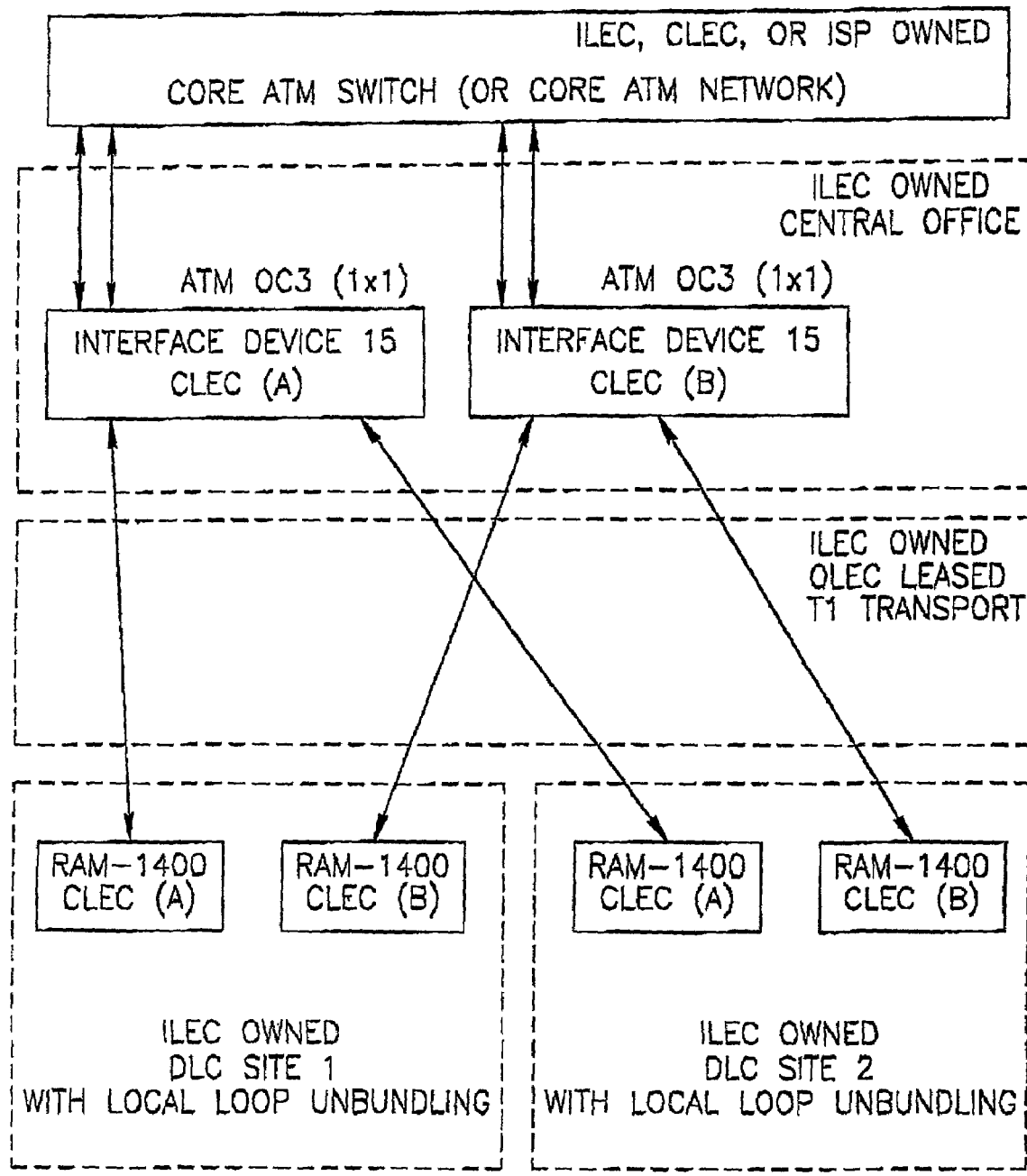
FIGS. 7–10 are simplified block diagram illustrations of network configurations of the interface device of FIG. 2 in CLEC (Competitive Local Exchange Carrier) owned networks and ILEC (Incumbent Competitive Local Exchange Carrier) owned networks.
Figure 8:
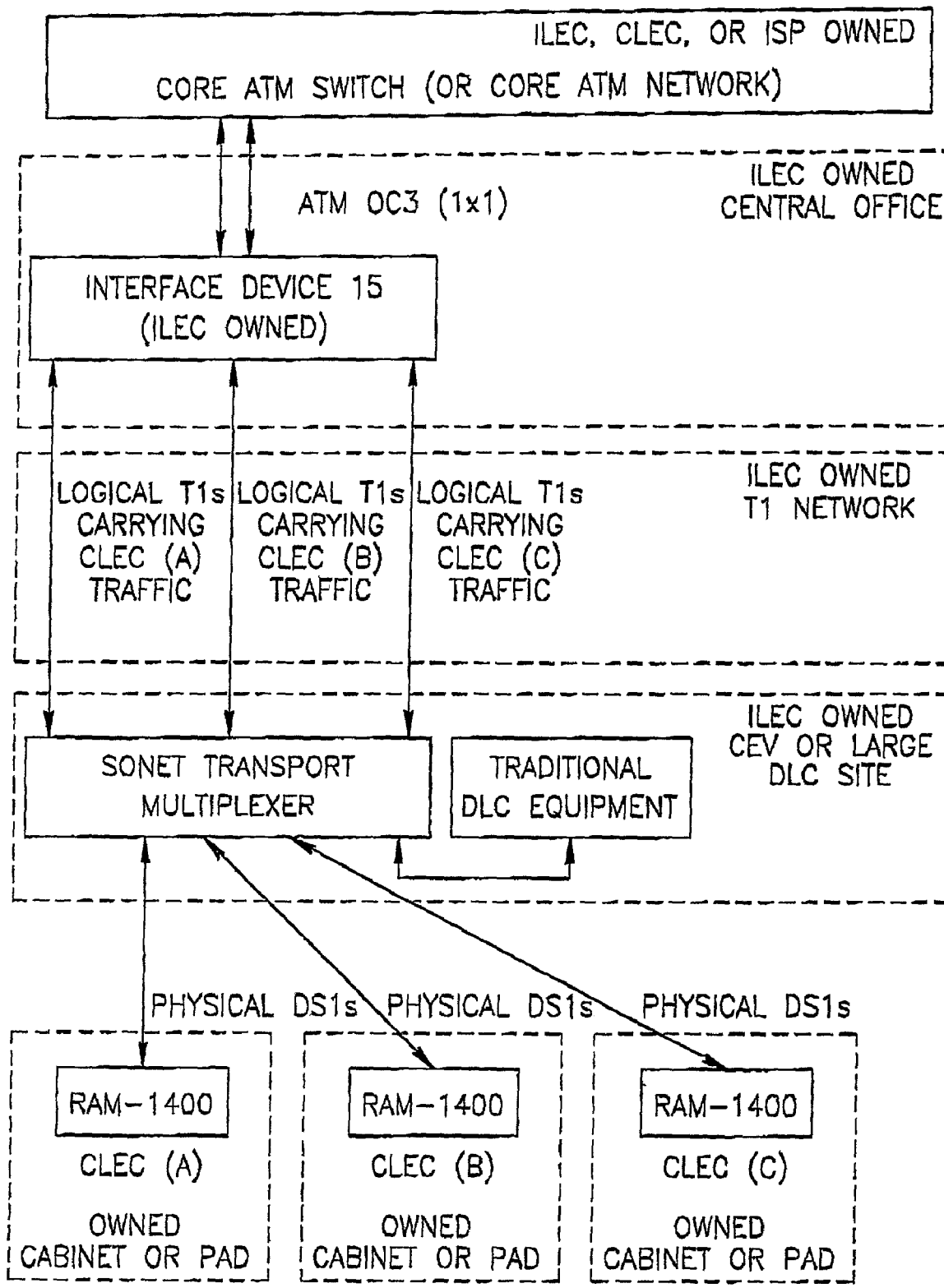
Figure 9:
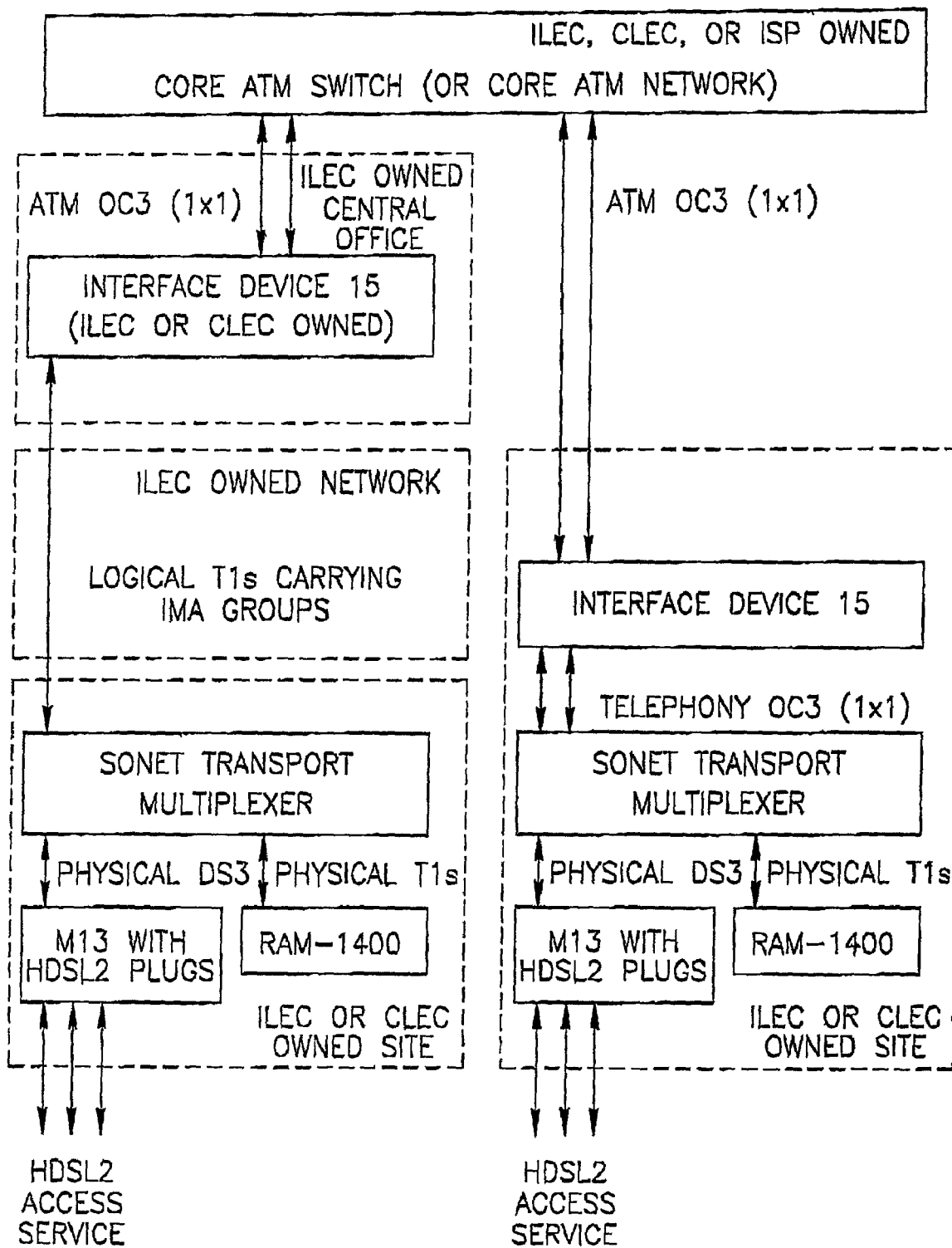
Figure 10:
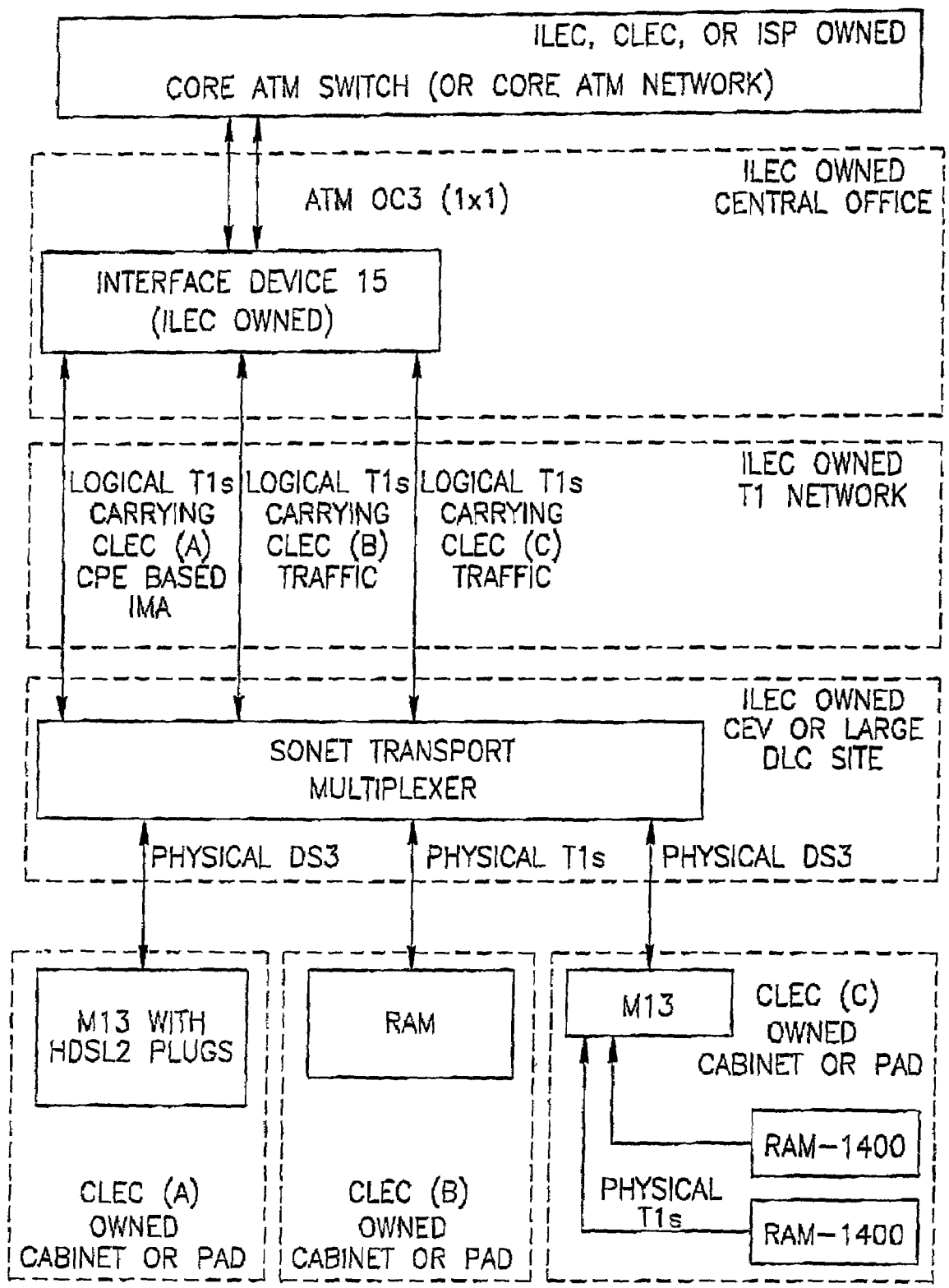

In FIG. 6, network traffic shaping with the interface device 15 is shown. FIGS. 7–10 show network configurations of the interface device 15 in Competitive Local Exchange Carrier (CLEC) owned networks and Incumbent Competitive Local Exchange Carrier (ILEC) owned networks.

Figure 11A:
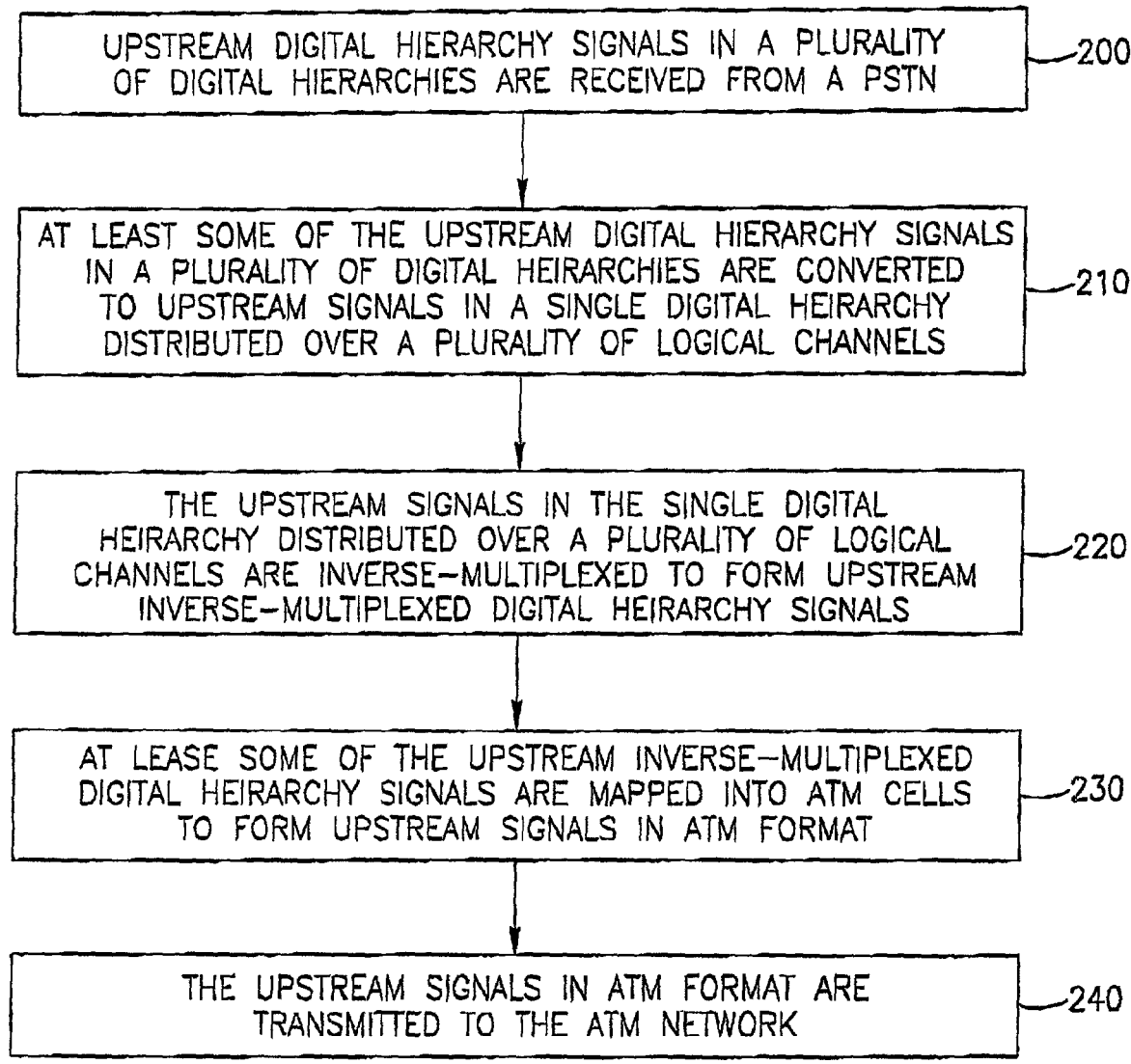
FIGS. 11A and 11B together constitute a simplified flow chart illustration of a preferred method of operation of the apparatus of FIGS. 1 and 2.
Figure 11B:
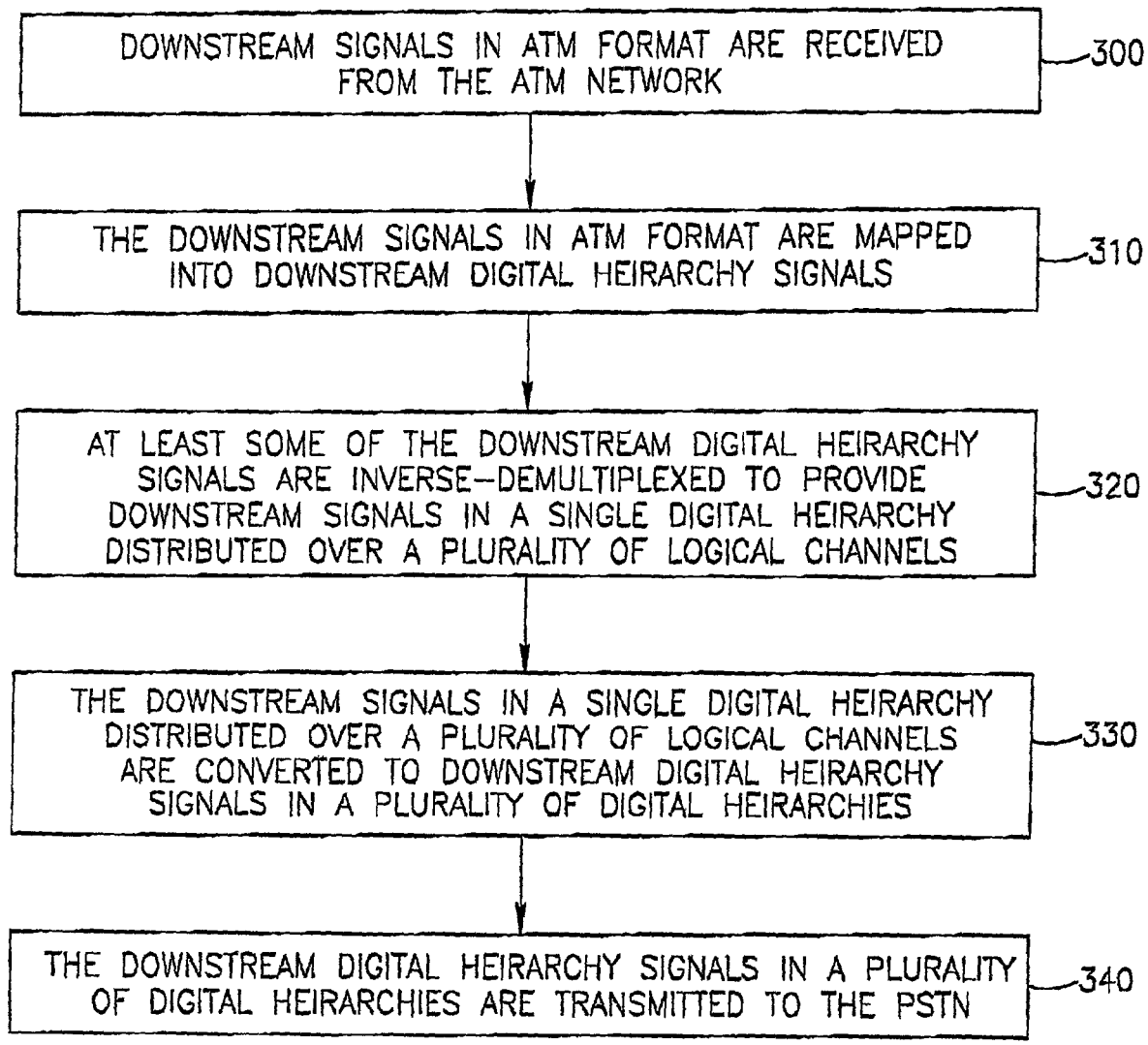

Reference is now made to FIGS. 11A and 11B that together constitute a simplified flow chart illustration of a preferred method of operation of the apparatus of FIGS. 1 and 2. FIG. 11A illustrates the operation of the apparatus of FIGS. 1 and 2 in an upstream direction from a PSTN to an ATM network, and FIG. 11B illustrates the operation of the apparatus of FIGS. 1 and 2 in a downstream direction from the ATM network to the PSTN.

In the upstream direction, upstream digital hierarchy signals in a plurality of digital hierarchies are preferably received from the PSTN (step 200). At least some of the upstream digital hierarchy signals in a plurality of digital hierarchies are preferably converted to upstream signals in a single digital hierarchy distributed over a plurality of logical channels (step 210). The upstream signals in the single digital hierarchy distributed over a plurality of logical channels are preferably inverse-multiplexed to form upstream inverse-multiplexed digital hierarchy signals (step 220), and at lease some of the upstream inverse-multiplexed digital hierarchy signals are mapped into ATM cells to form upstream signals in ATM format (step 230). The upstream signals in ATM format are then transmitted to the ATM network (step 240).

In the downstream direction, downstream signals in ATM format are preferably received from the ATM network (step 300) and mapped into downstream digital hierarchy signals (step 310). At least some of the downstream digital hierarchy signals are preferably inverse-demultiplexed to provide downstream signals in a single digital hierarchy distributed over a plurality of logical channels (step 320). The downstream signals in a single digital hierarchy distributed over a plurality of logical channels are preferably converted to downstream digital hierarchy signals in a plurality of digital hierarchies (step 330), and the downstream digital hierarchy signals in a plurality of digital hierarchies are preferably transmitted to the PSTN (step 340).

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

The invention claimed is:

1. An interface device for providing a gateway function between lines of a public switched telephone network (PSTN) that carry digital hierarchy signals in a plurality of digital hierarchies and an asynchronous transfer mode (ATM) backbone network that carries signals in ATM format, the interface device comprising:
   a telephony transceiver operative to receive upstream digital hierarchy signals in a plurality of digital hierarchies from the PSTN;
   a hierarchy converter operatively associated with the telephony transceiver to receive said upstream digital hierarchy signals in a plurality of digital hierarchy signals and operative to convert at least some of said received upstream digital hierarchy signals to upstream signals in a single digital hierarchy distributed over a plurality of logical channels;
   an inverse multiplexing unit operatively associated with the hierarchy converter to receive said upstream signals in the single digital hierarchy distributed over a plurality of logical channels therefrom and operative to inverse-multi-plex said received up-stream signals thereby to form upstream inverse-multiplexed digital hierarchy signals;
   an ATM framer operatively associated with the inverse multiplexing unit to receive said upstream inverse-multiplexed signals therefrom and operative to map at least some of the upstream inverse-multiplexed digital hierarchy signals into ATM cells thereby to form upstream signals in ATM format; and
   an ATM transceiver operatively associated with the ATM framer to receive said upstream signals therefrom and operative to transmit said upstream signals in ATM format to the ATM backbone network.

2. An interface device according to claim 1 and wherein said digital hierarchy signals in a plurality of digital hierarchies comprise at least one of the following: T1/E1 signals; T3/E3 signals; STS-N/STM-N signals, where N is an integer; and OC-M signals, where M is an integer.

3. An interface device according to claim 2 and wherein said telephony transceiver comprises at least one of the following: an optical carrier (OC) of level M (OC-M) transceiver, where N is an integer; a DS1 transceiver; and a DS3 transceiver.

4. An interface device according to claim 1 and wherein said hierarchy converter comprises at least one of the following: a demultiplexer; and a multiplexer.

5. An interface device according to claim 1 and wherein said inverse multiplexing unit comprises a plurality of inverse-multiplexers ATM (IMAs) each capable of multiplexing signals carried over a plurality of logical channels.

6. An interface device according to claim 1 and wherein said ATM transceiver comprises at least one, of the following: an OC-M transceiver, where M is an integer; and an STS-N/STM-N transceiver, where N is an integer.

7. An interface device according to claim 1 and also comprising an ATM bus operatively associated with the inverse multiplexing unit and the ATM framer and operative to receive the upstream inverse-multiplexed digital hierarchy signals from the inverse multiplexing unit, and to provide the upstream inverse-multiplexed digital hierarchy signals to the ATM framer.

8. An interface device according to claim 7 and wherein the ATM framer is an ATM UTOPIA framer and the ATM bus comprises a multi-UTOPIA bus.

9. An interface device according to claim 1 and also comprising AAL1 circuitry for providing constant bit rate (CBR) services that require a timing relation between endpoints of connections.

10. An interface device according to claim 1 and also comprising Frame-Relay/ATM internetworking circuitry for interfacing to a Frame-Relay.

11. An interface device according to claim 1 and wherein at least one of the hierarchy converter and the telephony transceiver is operative to provide a series of digital hierarchy signals to the ATM framer, and said ATM framer is operative to map said series of digital hierarchy signals into ATM cells thereby forming a series of signals in ATM format.

12. A communication device comprising the interface device of claim 1.

13. A communication network comprising a PSTN, an ATM backbone network, and the interface device of claim 1 operatively associated with the PSTN and the ATM backbone network.

14. A communication apparatus comprising an ATM switch, a digital access cross-connect system (DACS), and the interface device of claim 1 operatively associated with the ATM switch and the DACS.

15. Apparatus according to claim 14 and also comprising a SONET/SDH multiplexer operatively associated with the DACS and operative to provide to the DACS OC-M telephony signals, where M is an integer.

16. ATM switching fabric comprising a plurality of the interface device of claim 1, each of said plurality of the interface devices of claim 1 being operatively associated with the ATM switching fabric and an ATM backbone network.

17. An interface device for providing a gateway function between lines of a public switched telephone network (PSTN) that carry digital hierarchy signals in a plurality of digital hierarchies and an asynchronous transfer mode (ATM) backbone network that carries signals in ATM format, the interface device comprising:
an ATM transceiver operative to receive downstream signals in ATM format from the ATM backbone network;
an ATM UTOPIA framer operatively associated with the ATM transceiver to receive the downstream signals therefrom and operative to map the downstream signals in ATM format into downstream digital hierarchy signals;
an inverse multiplexing unit operatively associated with the ATM framer to receive said downstream digital hierarchy signals therefrom and operative to inverse-demultiplex at least some of said downstream digital hierarchy signals thereby providing downstream signals in a single digital hierarchy distributed over a plurality of logical channels;
a hierarchy converter operatively associated with the inverse multiplexing unit to receive said downstream signals in a single digital hierarchy distributed over a plurality of logical channels therefrom and operative to convert said downstream signals in a single digital hierarchy distributed over a plurality of logical channels to downstream digital hierarchy signals in a plurality of digital hierarchies; and
a telephony transceiver operatively associated with the hierarchy converter to receive said downstream digital hierarchy signals in a plurality of digital hierarchies therefrom and operative to transmit said downstream digital hierarchy signals in a plurality of digital hierarchies to the PSTN.

18. An interface device according to claim 17 and wherein said digital hierarchy signals in a plurality of digital hierarchies comprise at least one of the following: T1/E1 signals; T3/E3 signals; STS-N/STM-N signals, where N is an integer; and OC-M signals, wherein M is an integer.

19. An interface device according to claim 18 and wherein said telephony transceiver comprises at least one of the following: an optical carrier (OC) of level M (OC-M) transceiver, where M is an integer; a DS1 transceiver; and a DS3 transceiver.

20. An interface device according to claim 17 and wherein said hierarchy converter comprises at least one of the following: a demultiplexer; and a multiplexer.

21. An interface device according to claim 17 and wherein said inverse multiplexing unit comprises a plurality of inverse-demultiplexers ATM each capable of demultiplexing signals carried over a plurality of logical channels.

22. An interface device according to claim 17 and wherein said ATM transceiver comprises at least one of the following: an OC-M transceiver, where M is an integer; and an STS-N/STM-N transceiver, where N is an integer.

23. An interface device according to claims 17 and also comprising an ATM bus operatively associated with the ATM framer and the inverse multiplexing unit and operative to receive the downstream digital hierarchy signals from the ATM framer, and to provide the downstream digital hierarchy signals to the inverse multiplexing unit.

24. An interface device according to claim 23 and wherein the ATM framer is an ATM UTOPIA framer and the ATM bus comprises a multi-UTOPIA bus.

25. An interface device according to claim 17 and also comprising AAL1 circuitry for providing constant bit rate (CBR) services that require a timing relation between end-points of connections.

26. An interface device according to claim 17 and also comprising Frame-Relay/ATM internetworking circuitry for interfacing to a Frame-Relay.

27. A communication device comprising interface device of claim 17.

28. A communication network comprising a PSTN, an ATM backbone network, and the interface device of claim 17 operatively associated with the PSTN and the ATM backbone network.

29. A communication apparatus comprising an ATM switch, a digital access cross-connect system (DACS), and the interface devices of claim 17 operatively associated with the ATM switch and the DACS.

30. ATM switching fabric comprising a plurality of the interface devices of claim 17, each of said plurality of the interface devices of claim 17 being operatively associated with the ATM switching fabric and an ATM backbone network.

31. A method for providing a gateway function between lines of a public switched telephone network (PSTN) that carry digital hierarchy signals in a plurality of digital hierarchies and an asynchronous transfer mode (ATM) backbone network that carries signals in ATM format, the method comprising:
receiving upstream digital hierarchy signals in a plurality of digital hierarchies from the PSTN;
converting at least some of said upstream digital hierarchy signals in a plurality of digital hierarchies to upstream signals in a single digital hierarchy distributed over a plurality of logical channels;
inverse-multiplexing said upstream signals in the single digital hierarchy distributed over a plurality of logical channels thereby forming upstream inverse-multiplexed digital hierarchy signals;
mapping at lease some of the upstream inverse-multiplexed digital hierarchy signals into ATM cells thereby forming upstream signals in ATM format; and
transmitting the upstream signals in ATM format to the ATM backbone network.

32. A method according to claim 31 and also comprising the steps of:
receiving downstream signals in ATM format from the ATM backbone network;
mapping the downstream signals in ATM format into downstream digital hierarchy signals;
inverse-demultiplexing at least some of said downstream digital hierarchy signals thereby providing downstream signals in a single digital hierarchy distributed over a plurality of logical channels;

converting said downstream signals in a single digital hierarchy distributed over a plurality of logical channels to downstream digital hierarchy signals in a plurality of digital hierarchies; and transmitting said downstream digital hierarchy signals in a plurality of digital hierarchies to the PSTN.

33. A method according to claim 31 and wherein the digital hierarchy signals in a plurality of digital hierarchies comprise at least one of the following:

T1/E1 signals; T3/E3 signals; STS-N/STM-N signals, where N is an integer; and OC-M signals, where M is an integer.

34. A method according to claim 31 and wherein said converting step comprises the step of demultiplexing said at least some of said upstream digital hierarchy signals in a plurality of digital hierarchies thereby providing said upstream signals in a single digital hierarchy distributed over a plurality of logical channels.

35. A method according to claim 31 and also comprising the step of mapping at least some of the upstream signals in a single digital hierarchy distributed over a plurality of logical channels into upstream signals suitable for transmission over a Frame-Relay.

36. A method for providing a gateway function between lines of a public switched telephone network (PSTN) that carry digital hierarchy signals in a plurality of digital hierarchies and an asynchronous transfer mode (ATM) backbone network that carries signals in ATM format, the method comprising:

receiving downstream signals in ATM format from the ATM backbone network;

mapping the downstream signals in ATM format into downstream digital hierarchy signals;

inverse-demultiplexing at least some of said downstream digital hierarchy signals thereby providing downstream signals in a single digital hierarchy distributed over a plurality of logical channels;

converting said downstream signals in a single digital hierarchy distributed over a plurality of logical channels to downstream digital hierarchy signals in a plurality of digital hierarchies; and transmitting said downstream digital hierarchy signals in a plurality of digital hierarchies to the PSTN.

37. A method according to claim 36 and wherein said converting step comprises the step of demultiplexing said downstream signals in a single digital hierarchy distributed over a plurality of logical channels thereby providing said downstream digital hierarchy signals in a plurality of digital hierarchies.

38. A method according to claim 36 and also comprising the step of mapping at least some of the upstream signals in a single digital hierarchy distributed over a plurality of logical channels into upstream AAL1 type signals.

39. A method according to claim 36 and also comprising the step of mapping at least some of the downstream digital hierarchy signals into downstream AAL1 type signals.

40. A method according to claim 36 and also comprising the step of mapping at least some of the downstream digital hierarchy signals into downstream signals suitable for transmission over a Frame-Relay.

* * * * *